US012244059B2

(12) United States Patent
Lee et al.

(10) Patent No.: US 12,244,059 B2
(45) Date of Patent: Mar. 4, 2025

(54) ANTENNA DEVICE AND DISPLAY DEVICE INCLUDING THE SAME

(71) Applicants: DONGWOO FINE-CHEM CO., LTD., Jeollabuk-do (KR); POSTECH RESEARCH AND BUSINESS DEVELOPMENT FOUNDATION, Gyeongsangbuk-do (KR)

(72) Inventors: Jae Hyun Lee, Gyeonggi-do (KR); Dong Pil Park, Incheon (KR); Won Hee Lee, Incheon (KR); Hee Jun Park, Gyeonggi-do (KR); Won Bin Hong, Seoul (KR)

(73) Assignees: DONGWOO FINE-CHEM CO., LTD., Jeollabuk-Do (KR); POSTECH RESEARCH AND BUSINESS DEVELOPMENT FOUNDATION, Gyeongsangbuk-Do (KR)

( * ) Notice: Subject to any disclaimer, the term of this patent is extended or adjusted under 35 U.S.C. 154(b) by 170 days.

(21) Appl. No.: 18/077,320

(22) Filed: Dec. 8, 2022

(65) Prior Publication Data

US 2023/0097532 A1 Mar. 30, 2023

Related U.S. Application Data

(63) Continuation of application No. PCT/KR2021/007066, filed on Jun. 7, 2021.

(30) Foreign Application Priority Data

Jun. 8, 2020 (KR) ........................ 10-2020-0068911

(51) Int. Cl.
*H01Q 1/44* (2006.01)
*H01Q 1/12* (2006.01)
(Continued)

(52) U.S. Cl.
CPC ............. *H01Q 1/44* (2013.01); *H01Q 1/1271* (2013.01); *H01Q 1/243* (2013.01); *H01Q 9/40* (2013.01); *H01Q 21/24* (2013.01); *H01Q 21/28* (2013.01)

(58) Field of Classification Search
CPC ........ H01Q 1/1271; H01Q 1/22; H01Q 1/243; H01Q 1/36; H01Q 1/38; H01Q 1/46;
(Continued)

(56) References Cited

U.S. PATENT DOCUMENTS 6,057,802 A 5/2000 Nealy et al.
2017/0294705 A1* 10/2017 Khripkov ................. H01Q 1/38
2019/0058264 A1 2/2019 Jung et al.

FOREIGN PATENT DOCUMENTS

CN 102097675 A 6/2011
CN 215119231 U 12/2021
(Continued)

OTHER PUBLICATIONS

Office action issued on Jun. 15, 2024 from Korean Patent Office in a counterpart Korean Patent Application No. 10-2020-0068911 (all the cited references are listed in this IDS.) (English translation is also submitted herewith.).
(Continued)

*Primary Examiner* — Robert Karacsony
(74) *Attorney, Agent, or Firm* — The PL Law Group, PLLC

(57) ABSTRACT

An antenna device according to an embodiment of the present invention includes a dielectric layer, a first radiator disposed on the dielectric layer in a first direction, a second radiator formed in a shape different from that of the first radiator and disposed on the dielectric layer in a second direction, a first transmission line which extends in the first direction to be connected to the first radiator, and a second
(Continued)

transmission line which extends in the second direction to be connected to the second radiator, and intersects the first transmission line with being physically or electrically spaced apart therefrom.

14 Claims, 13 Drawing Sheets

(51) Int. Cl.
*H01Q 1/24* (2006.01)
*H01Q 9/40* (2006.01)
*H01Q 21/24* (2006.01)
*H01Q 21/28* (2006.01)

(58) Field of Classification Search
CPC .. H01Q 1/44; H01Q 1/48; H01Q 1/50; H01Q 1/521; H01Q 5/10; H01Q 5/28; H01Q 5/307; H01Q 9/30; H01Q 9/40; H01Q 21/00; H01Q 21/24; H01Q 21/28
See application file for complete search history.

(56) References Cited

FOREIGN PATENT DOCUMENTS

| | | | |
|---|---|---|---|
| EP | 2 093 890 | A1 | 8/2009 |
| JP | 2016-015671 | A | 1/2016 |
| KR | 10-1107295 | B1 | 1/2012 |
| KR | 10-2014-0128193 | A | 11/2014 |
| KR | 10-2016-0036436 | A | 4/2016 |
| KR | 10-2016-0050467 | A | 5/2016 |
| KR | 10-1940797 | B1 | 1/2019 |
| KR | 10-1971441 | B1 | 4/2019 |
| KR | 10-2020-0043124 | A | 4/2020 |
| WO | WO 2013/144965 | A1 | 10/2013 |

OTHER PUBLICATIONS

International Search Report for PCT/KR2021/007066 mailed on Oct. 5, 2021.

Office action issued on Nov. 26, 2024 from China Patent Office in a counterpart China Patent Application No. 202110638895.1 (all the cited references are listed in this IDS.) (English translation is also submitted herewith.).

* cited by examiner

100

100a

100b

100c

ANTENNA DEVICE AND DISPLAY DEVICE INCLUDING THE SAME

CROSS-REFERENCE TO RELATED APPLICATION AND CLAIM OF PRIORITY

The present application is a continuation application to International Application No. PCT/KR2021/007066 with an International Filing Date of Jun. 7, 2021, which claims the benefit of Korean Patent Applications No. 10-2020-0068911 filed on Jun. 8, 2020 at the Korean Intellectual Property Office, the disclosures of which are incorporated by reference herein in their entirety.

BACKGROUND

1. Field

The present invention relates to an antenna device and a display device including the same.

2. Background of the Related Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in high frequency or ultra-high frequency bands to be coupled to the display device. In addition, according to development of thin, high-transparency and high-resolution display devices such as a transparent display and a flexible display, it is necessary to develop an antenna so as to also have improved transparency and flexibility.

As the size of a screen in the display device is increased, a space or area of a bezel part or light-shielding part has been decreased. In this case, the space or area in which the antenna can be embedded is also limited, and thereby, a radiator included in the antenna to transmit and receive signals may be overlapped with a display region of the display device. Accordingly, an image of the display device may be hidden by the radiator of the antenna or the radiator may be viewed by a user, thereby causing a deterioration in image quality.

Meanwhile, a dual polarization antenna is an antenna having two polarized waves at a predetermined angle, unlike a general single polarization antenna having only vertically or horizontally polarized waves, and is emerging as a technique capable of reducing installation costs and operation and maintenance costs in a mobile communication system.

Therefore, it is necessary to design a dual polarization antenna for implementing high-frequency communication in a limited space without being viewed by the user.

SUMMARY

According to an aspect of the present invention, there is provided an antenna device and a display device including the same.

The above aspects of the present invention will be achieved by one or more of the following features or constructions:

1. An antenna device including: a dielectric layer; a first radiator disposed on the dielectric layer in a first direction; a second radiator formed in a shape different from that of the first radiator and disposed on the dielectric layer in a second direction; a first transmission line which extends in the first direction to be connected to the first radiator; and a second transmission line which extends in the second direction to be connected to the second radiator, and intersects the first transmission line with being physically or electrically spaced apart therefrom.

2. The antenna device according to the above 1, wherein at least one of the first radiator and the second radiator is formed in a notch shape.

3. The antenna device according to the above 1, wherein the first radiator and the second radiator are operated at the same resonance frequency, and the first radiator is configured to radiate in a broadside direction and the second radiator is configured to radiate in an end-fire direction.

4. The antenna device according to the above 1, wherein the first radiator and the second radiator are operated at the same resonance frequency, and the first radiator and the second radiator are configured to radiate in a broadside direction or in an end-fire direction.

5. The antenna device according to the above 1, wherein the first radiator and the second radiator are operated at different resonance frequencies, and the first radiator is configured to radiate in a broadside direction and the second radiator is configured to radiate in an end-fire direction.

6. The antenna device according to the above 1, wherein the first radiator and the second radiator are operated at different resonance frequencies, and the first radiator and the second radiator are configured to radiate in a broadside direction or in an end-fire direction.

7. The antenna device according to the above 1, wherein each of the first radiator and the second radiator is operated at a multi-band resonance frequency.

8. The antenna device according to the above 1, wherein the first radiator, the second radiator, the first transmission line and the second transmission line are formed on the same layer, the second transmission line includes: two separated line segments; and a bridge which electrically connects the two separated line segments.

9. The antenna device according to the above 1, wherein the first radiator and the second radiator are formed on different layers.

10. The antenna device according to the above 9, wherein a transparent layer is formed between the first radiator and the second radiator.

11. The antenna device according to the above 1, wherein the first direction and the second direction intersect each other.

12. The antenna device according to the above 11, wherein the first direction and the second direction are parallel to an upper surface of the dielectric layer, and intersect a longitudinal direction of the antenna device.

13. A display device; including the antenna device according to the above-described embodiments.

By disposing two radiation bodies in a first direction and a second direction which intersect each other, and intersecting two transmission lines connected to the respective radiation bodies with being physically and/or electrically separated from each other, it is possible to implement a dual polarization antenna with excellent isolation at a compact location.

In addition, by arranging radiation bodies having different shapes, polarization, radiation direction, and operating frequency may be optimized according to requirements of the system.

DETAILED DESCRIPTION OF THE EMBODIMENTS

Figure 1:
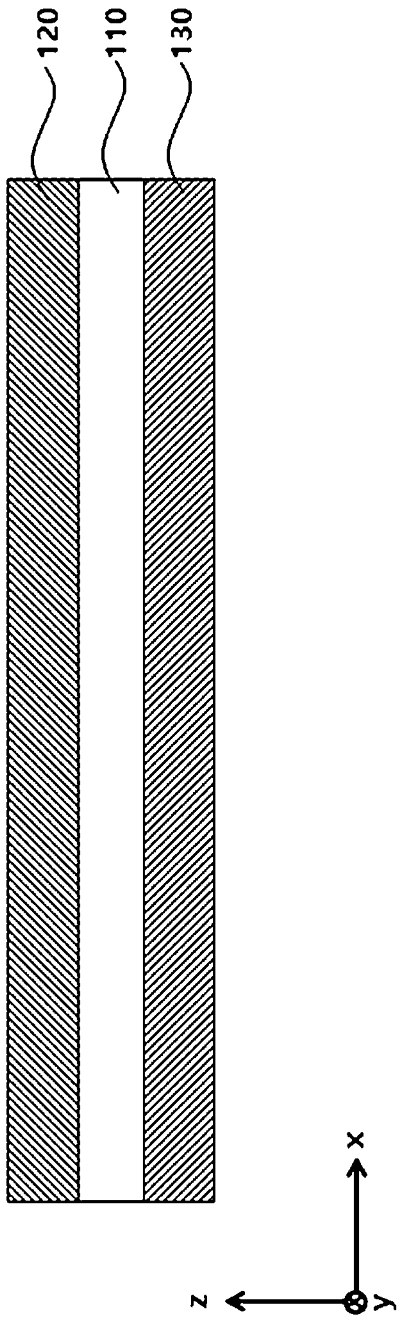
FIG. 1 is a schematic cross-sectional view illustrating an embodiment of an antenna device.

Hereinafter, embodiments will be described in detail with reference to the accompanying drawings. In denoting reference numerals to components of respective drawings, it should be noted that the same components will be denoted by the same reference numerals although they are illustrated in different drawings.

In the description of preferred embodiments of the present invention, the publicly known functions and configurations that are judged to be able to make the purport of the present invention unnecessarily obscure will not be described in detail. Further, wordings to be described below are defined in consideration of the functions of the embodiments, and may differ depending on the intentions of a user or an operator or custom. Accordingly, such wordings should be defined on the basis of the contents of the overall specification.

It will be understood that, although the terms first, second, etc. may be used herein to describe various elements or components, these elements or components should not be limited by these terms. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or a combination thereof, but do not preclude the presence or addition of one or more other features, integers, steps, operations, elements, components, and/or a combination thereof.

Further, directional terms such as "one side," "the other side," "upper," "lower," and the like are used in connection with the orientation of the disclosed drawings. Since the elements or components of the embodiments of the present invention may be located in various orientations, the directional terms are used for illustrative purposes, and are not intended to limit the present invention thereto.

In addition, a division of the configuration units in the present disclosure is intended for ease of description and divided only by the main function set for each configuration unit. That is, two or more of the configuration units to be described hereinafter may be combined into a single configuration unit or formed by two or more of divisions by function into more than a single configuration unit. Further, each of the configuration units to be described hereinafter may additionally perform a part or all of the functions among functions set for other configuration units other than being responsible for the main function, and a part of the functions among the main functions set for each of the configuration units may be exclusively taken and certainly performed by other configuration units An antenna device described in the present disclosure may be a microstrip patch antenna manufactured in a form of a transparent film. For example, the antenna device may be applied to electronic devices for high frequency or ultra-high frequency (e.g., 3G, 4G, 5G or more) mobile communication, Wi-Fi, Bluetooth, near field communication (NFC), global positioning system (GPS), and the like, but it is not limited thereto. Herein, the electronic device may include a mobile phone, a smartphone, a tablet, a laptop computer, a personal digital assistant (PDA), a portable multimedia player (PMP), a navigation device, an MP3 player, a digital camera, a wearable device and the like. The wearable device may include a wristwatch type, a wrist band type, a ring type, a belt type, a necklace type, an ankle band type, a thigh band type, a forearm band type wearable device or the like. However, the electronic device is not limited to the above-described example, and the wearable device is also not limited to the above-described example.

In the following drawings, two directions which are parallel to an upper surface of a dielectric layer and intersect each other perpendicularly are defined as an x direction and a y direction, and a direction perpendicular to the upper surface of the dielectric layer is defined as a z direction. For example, the x direction may correspond to a width direction of the antenna device, they direction may correspond to a length direction of the antenna device, and the z direction may correspond to a thickness direction of the antenna device.

FIG. 1 is a schematic cross-sectional view illustrating an embodiment of an antenna device.

Referring to FIG. 1, an antenna device 100 may include a dielectric layer 110 and an antenna conductive layer 120.

The dielectric layer 110 may include an insulation material having a predetermined dielectric constant. According to an embodiment, the dielectric layer 110 may include an inorganic insulation material such as glass, silicon oxide, silicon nitride, or metal oxide, or an organic insulation material such as an epoxy resin, an acrylic resin, or an imide resin. The dielectric layer 110 may function as a film substrate of the antenna device on which the antenna conductive layer 120 is formed.

According to an embodiment, a transparent film may be provided as the dielectric layer 110. In this case, the transparent film may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acrylic resin such as polymethyl (meth)acrylate, polyethyl(meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin, urethane or acrylic urethane resin, silicone resin and the like. These transparent films may be used alone or in combination of two or more thereof.

According to an embodiment, an adhesive film such as an optically clear adhesive (OCA), an optically clear resin (OCR), and the like may also be included in the dielectric layer 110.

In some embodiments, the dielectric layer 110 may include an inorganic insulation material such as silicon oxide, silicon nitride, silicon oxynitride, glass and the like.

According to an embodiment, the dielectric layer 110 may be formed in a substantial single layer, or may be formed in a multilayer structure of two or more layers.

Capacitance or inductance may be generated by the dielectric layer 110, thus to adjust a frequency band which can be driven or sensed by the antenna device 100. When the dielectric constant of the dielectric layer 110 exceeds about 12, a driving frequency is excessively reduced, such that driving of the antenna in a desired high frequency band may not be implemented. Therefore, according to an embodiment, the dielectric constant of the dielectric layer 110 may be adjusted in a range of about 1.5 to 12, and preferably about 2 to 12.

According to an embodiment, an insulation layer (e.g., an encapsulation layer, a passivation layer, etc. of a display panel) inside the display device on which the antenna device 100 is mounted may be provided as the dielectric layer 110.

The antenna conductive layer 120 may be disposed on an upper surface of the dielectric layer 110. The antenna conductive layer 120 may include an antenna unit including a first radiator and a second radiator.

The antenna unit may include low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one thereof. These may be used alone or in combination of two or more thereof.

For example, the antenna unit may include silver (Ag) or a silver alloy (e.g., a silver-palladium-copper (APC) alloy) to implement a low resistance. For another example, the antenna unit may include copper (Cu) or a copper alloy (e.g., a copper-calcium (CuCa) alloy) in consideration of low resistance and fine line width patterning.

According to an embodiment, the antenna unit may include a transparent conductive oxide such as indium tin oxide (ITO), indium zinc oxide (IZO), indium zinc tin oxide (IZTO), zinc oxide (ZnOx), or copper oxide (CuO).

According to an embodiment, the antenna unit may include a lamination structure of a transparent conductive oxide layer and metal layer, for example, and may have a two-layer structure of transparent conductive oxide layer-metal layer or a three-layer structure of transparent conductive oxide layer-metal layer-transparent conductive oxide layer. In this case, resistance may be reduced to improve signal transmission speed while improving flexible properties by the metal layer, and corrosion resistance and transparency may be improved by the transparent conductive oxide layer.

According to an embodiment, the antenna conductive layer 120 may include a blackening processing part. Accordingly, reflectance on the surface of the antenna conductive layer 120 may be reduced, thereby decreasing the pattern from being viewed due to light reflection.

According to an embodiment, the surface of the metal layer included in the antenna conductive layer 120 is converted into metal oxide or metal sulfide to form a blackened layer. According to an embodiment, the blackened layer such as a black material coating layer or a plating layer may be formed on the antenna conductive layer 120 or the metal layer. Herein, the black material coating layer or plating layer may include silicon, carbon, copper, molybdenum, tin, chromium, nickel, cobalt, or oxide, sulfide, or an alloy containing at least one of them.

The composition and thickness of the blackened layer may be adjusted in consideration of an effect of reducing reflectance.

Specific details of the antenna conductive layer 120 will be described below with reference to FIGS. 2 and 12.

According to an embodiment, the antenna device 100 may further include a ground layer 130. Since the antenna device 100 includes the ground layer 130, vertical radiation characteristics may be implemented.

The ground layer 130 may be formed on a lower surface of the dielectric layer 110. The ground layer 130 may be disposed so as to be entirely or partially overlapped with the antenna conductive layer 120 in a planar direction.

According to an embodiment, a conductive member of the display device or display panel on which the antenna device 100 is mounted may be provided as the ground layer 130. For example, the conductive member may include electrodes or wirings such as a gate electrode, source/drain electrodes, pixel electrode, common electrode, data line, scan line, etc. of a thin film transistor (TFT) included in the display panel; and a stainless steel (SUS) plate, heat radiation sheet, digitizer, electromagnetic wave shielding layer, pressure sensor, fingerprint sensor, etc. of the display device.

Figure 2:
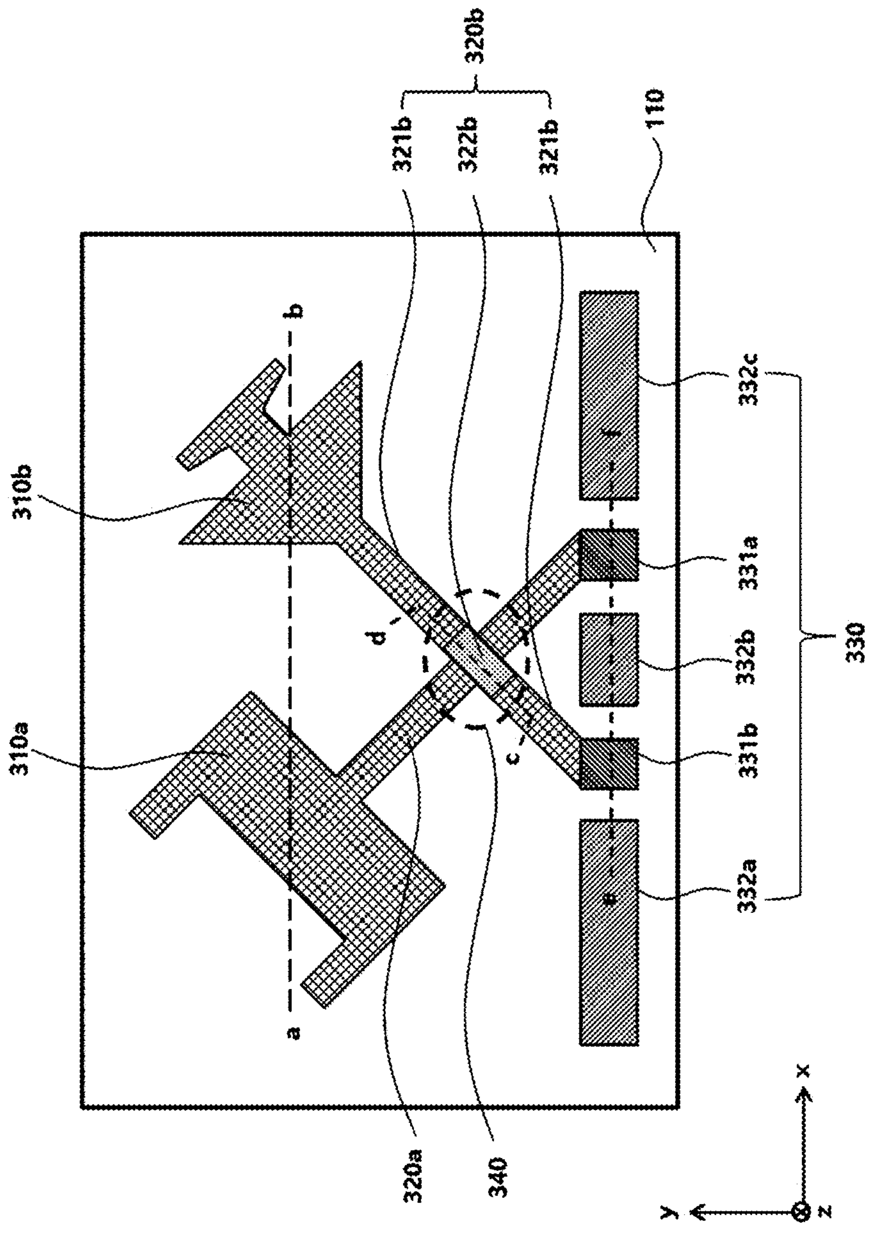
FIG. 2 is a schematic plan view illustrating an embodiment of the antenna device.
Figure 3:
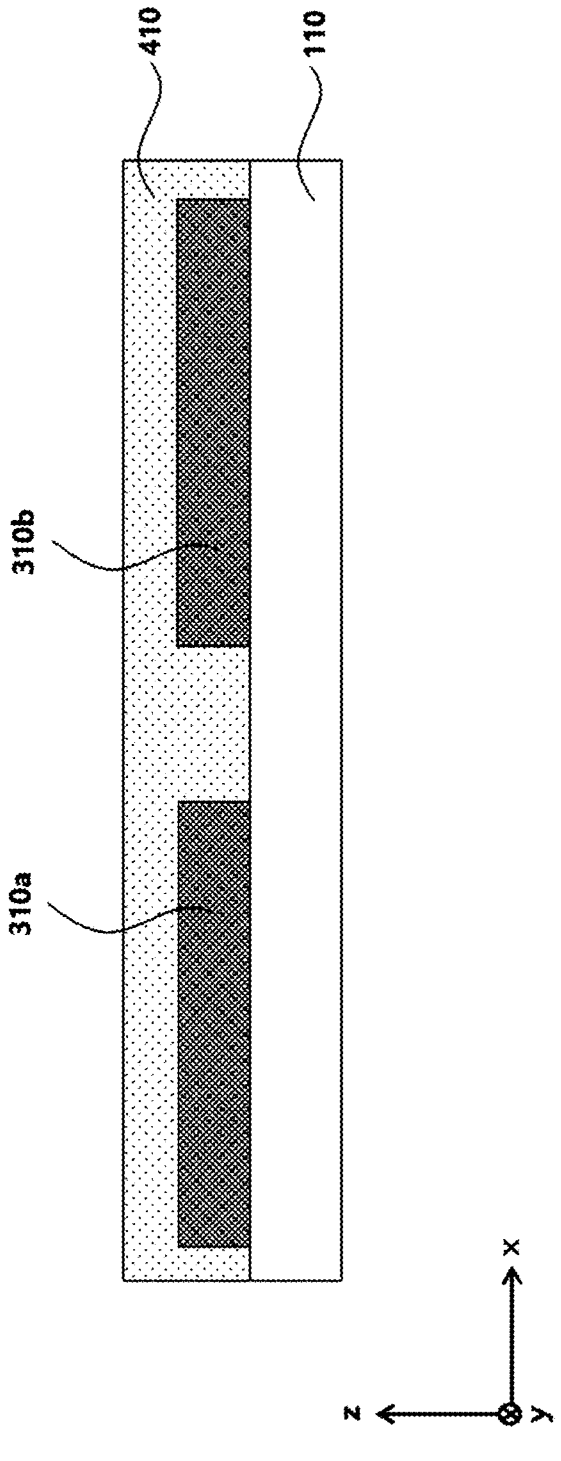
FIG. 3 is a schematic cross-sectional view taken on line a-b in FIG. 2.
Figure 4:
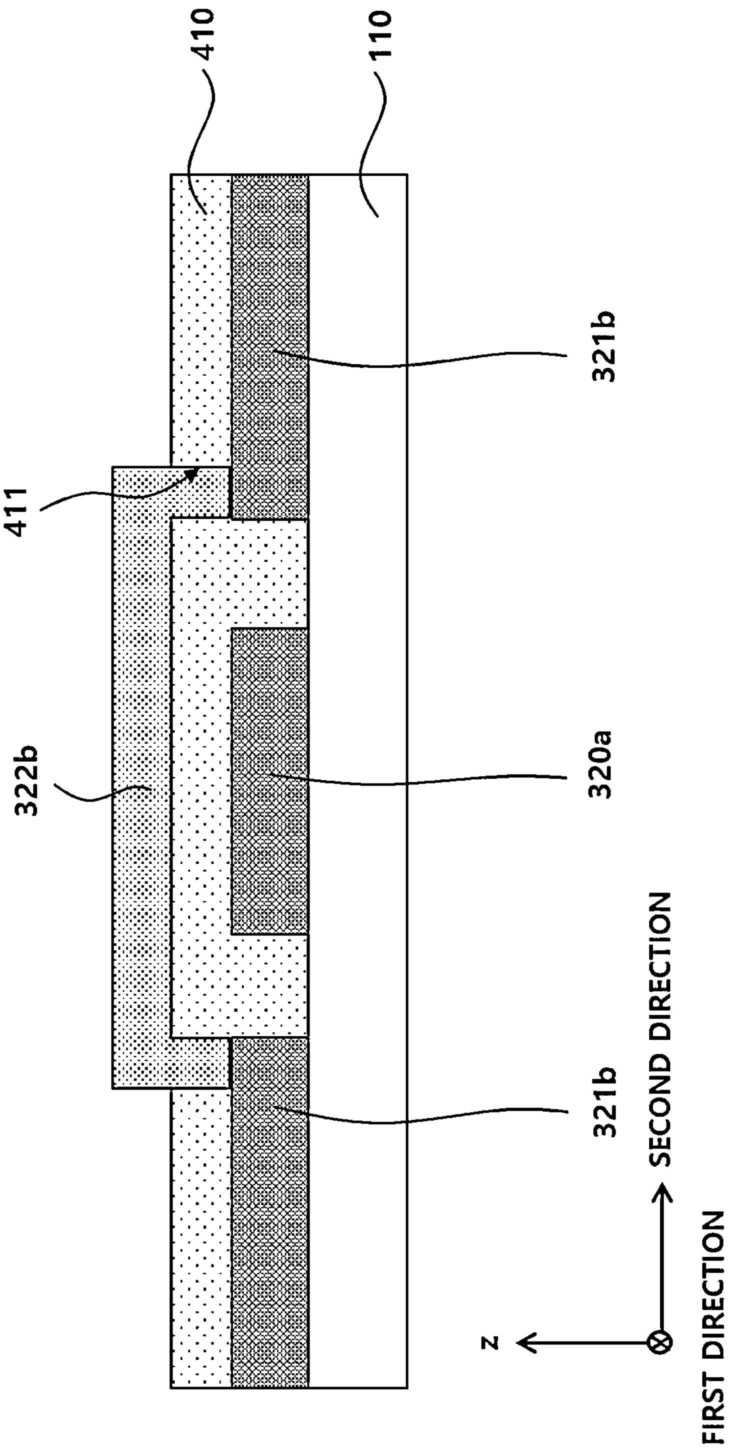
FIG. 4 is a schematic cross-sectional view taken on line c-d FIG. 2.
Figure 5:
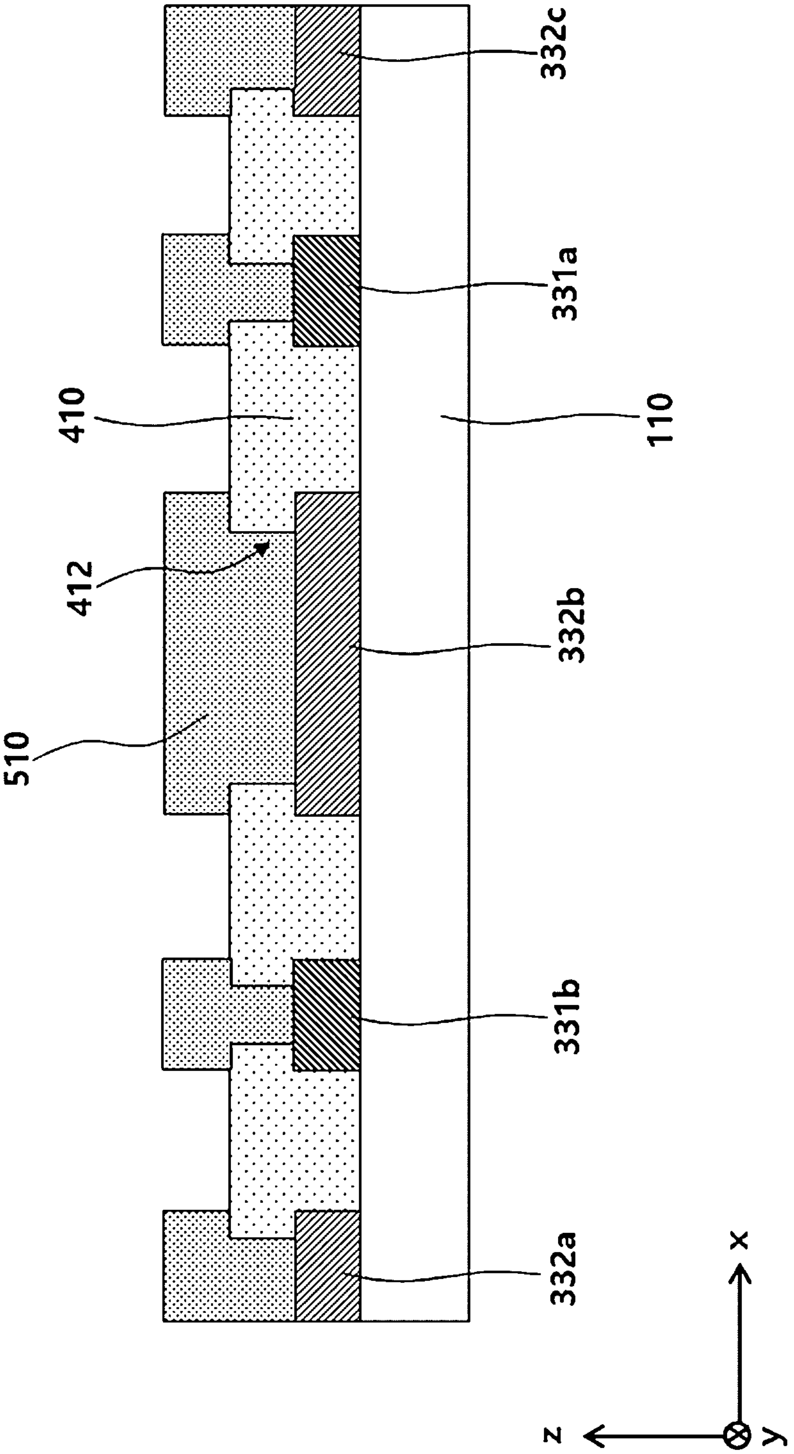
FIG. 5 is a schematic cross-sectional view taken on line e-f in FIG. 2.

FIG. 2 is a schematic plan view illustrating an embodiment of the antenna device, FIG. 3 is a schematic cross-sectional view taken on line a-b in FIG. 2, FIG. 4 is a schematic cross-sectional view taken on line c-d in FIG. 2, and FIG. 5 is a schematic cross-sectional view taken on line e-f in FIG. 2. Herein, an antenna device **100*a* of FIG. 2 may be an embodiment of the antenna device 100 shown in FIG. 1. In addition, the transparent layer 410 will not be illustrated in FIG. 2** for the convenience of description.

Referring to FIG. 2 to FIG. 5, the antenna device **100*a* according to an embodiment may include an antenna conductive layer formed on the dielectric layer 110, and the antenna conductive layer may include a first radiator 310*a*, a second radiator 310*b*, a first transmission line 320*a*, and a second transmission line 320*b* and a pad electrode 330**.

The first radiator **310*a* may be formed on the dielectric layer 110 in a mesh structure, and disposed on the upper surface of the dielectric layer 110 in a first direction. The second radiator 310*b* may be formed on the dielectric layer 110 in a mesh structure having substantially the same structure (e.g., the same line width, the same interval, etc.) as the first radiator 310*a*** or a different structure (e.g., a different line width, a different interval, etc.), and disposed on the upper surface of the dielectric layer in a second direction. Herein, the first direction and the second direction may be perpendicular to the z-axis and intersect the y-axis. In addition, the first direction and the second direction may intersect each other. In this case, the first direction and the second direction may be orthogonal to each other, but this is only an example and it is not limited thereto.

Resonance frequencies of the first radiator 310*a* and the second radiator 310*b* may be the same as or different from each other. In addition, the respective first radiator 310*a* and the second radiator 310*b* may be operated at a single-band resonance frequency or a multi-band resonance frequency.

The first radiator 310*a* and the second radiator 310*b* may be implemented in a planar shape, and the shapes of the first radiator 310*a* and the second radiator 310*b* may be different from each other. According to an embodiment, the first radiator 310*a* and/or the second radiator 310*b* may be implemented in a notch shape having different forms. However, it is not limited thereto, and the first radiator 310*a* and the second radiator 310*b* may be implemented in various different planar shapes such as a rhombus, a circle, and a polygon, etc.

According to an embodiment, both the first radiator 310*a* and the second radiator 310*b* may be formed in a shape capable of radiating in a broadside direction (e.g., the shape of the first radiator 310*a* shown in FIG. 3) or in a shape capable of radiating in an end-fire direction (e.g., the shape of the second radiator 310*b* shown in FIG. 3). Alternately, one of the first radiator 310*a* and the second radiator 310*b* may be formed in a shape capable of radiating in the broadside direction, and the other one may be formed in a shape capable of radiating in the end-fire direction. Herein, the expression "radiating in the broadside direction" may mean radiating in a direction perpendicular to the upper surface of the dielectric layer 110, and the expression "radiating in the end-fire direction" may mean radiating in a direction parallel to the upper surface of the dielectric layer 110.

The first radiator 310*a* may be electrically connected to the first transmission line 320*a* and supplied with a power through the first transmission line 320*a*, and the second radiator 310*b* may be electrically connected to the second transmission line 320*b* and supplied with a power through the second transmission line 320*b*.

The first transmission line 320*a* may be formed on the dielectric layer 110 to electrically connect the first signal pad 331*a* and the first radiator 310*a*. More specifically, the first transmission line 320*a* may be connected to the first signal pad 331*a*, and extend from the first signal pad 331*a* in the first direction to be connected to the first radiator 310*a*.

According to an embodiment, the first transmission line 320*a* may include substantially the same conductive material as the first radiator 310*a*. In addition, the first transmission line 320*a* may be formed as a substantial single member by integrally connecting with the first radiator 310*a*, or formed as a separate member from the first radiator 310*a*.

According to an embodiment, the first transmission line 320*a* may be formed in a mesh structure having substantially the same structure (e.g., the same line width, the same interval, etc.) as the first radiator 310*a*.

The second transmission line 320*b* may be formed on the dielectric layer 110 to electrically connect the second signal pad 331*b* and the second radiator 310*b*. More specifically, the second transmission line 320*b* may be connected to the first signal pad 331*b*, and extend from the first signal pad 331*b* in the first direction to be connected to the second radiator 310*b*.

The second transmission line 320*b* may be physically and/or electrically spaced apart from the first transmission line 320*a* and intersect the first transmission line 320*a*. To this end, the second transmission line 320*b* may include two line segments 321*b* separated from each other at an intersection region 340 which intersects the first transmission line 320*a*, and a bridge 322*b* which electrically connects the separated portions.

According to an embodiment, the two line segments 321*b* may include substantially the same conductive material as the second radiator 310*b*, and may be formed in a mesh structure having substantially the same structure (e.g., the same line width, the same interval, etc.) as the second radiator 310*b*.

In addition, the bridge 322*b* may include substantially the same conductive material as the two line segments 321*b*, and may be formed in a mesh structure having substantially the same structure (e.g., the same line width, the same interval, etc.) as the two line segments 321*b*. However, this is only one example, and the bridge 322*b* may include a different conductive material from the two line segments 321*b*. In addition, the bridge 322*b* may be formed in a mesh structure having a shape different from that of the two line segments 321*b*, or may be formed in a solid structure unlike the two line segments 321*b*.

The pad electrode 330 is formed on the dielectric layer 110, and may include a first signal pad 331*a*, a second signal pad 331*b*, a first ground pad 332*a*, a second ground pad 332*b* and a third ground pad 332*c*.

The first signal pad 331*a* may be connected to an end of the first transmission line 320*a*, thus to be electrically connected to the first radiator 310*a* through the first transmission line 320*a*. The second signal pad 331*b* may be connected to an end of the second transmission line 320*b*, thus to be electrically connected to the second radiator 310*b* through the second transmission line 320*b*. Thereby, the first signal pad 331*a* may electrically connect a driving circuit unit (such as a radio frequency integrated circuit (RFIC)) with the first radiator 310*a*, and the second signal pad 331*b* may electrically connect the driving circuit unit with the second radiator 310*b*. For example, a flexible printed circuit board (FPCB) may be bonded to the first signal pad 331*a* (or a capping electrode connected to the first signal pad) and the second signal pad 331*b* (or a capping electrode connected to the second signal pad), and transmission lines of the FPCB may be electrically connected to the first signal pad 331*a* and the second signal pad 331*b*. For example, the first signal pad 331*a* and the second signal pad 331*b* may be electrically connected to the FPCB using an anisotropic conductive film (ACF) bonding technique, which is a bonding method that allows electrical conduction up and down and insulates left and right using an anisotropic conductive film (ACF), or using a coaxial cable, but it is not limited thereto. The driving circuit unit may be mounted on the FPCB or a separate printed circuit board (PCB) to be electrically connected to the transmission line of the FPCB. Accordingly, each of the first radiator 310*a* and the second radiator 310*b* and the driving circuit unit may be electrically connected with each other.

The first ground pad 332*a*, the second ground pad 332*b* and the third ground pad 332*c* may be disposed around the signal pads 331*a* and 331*b* so as to be electrically and physically separated from the signal pads 331*a* and 331*b*. For example, the first ground pad 332*a* and the third ground pad 332*c* may be disposed to face each other with the signal pads 331*a* and 331*b* interposed therebetween, and the second ground pad 332*b* may be disposed between the signal pads 331*a* and 331*b*.

According to an embodiment, the signal pads 331*a* and 331*b* and the ground pads 332*a*, 332*b* and 332*c* may be formed in a solid structure including the above-described metal or alloy to reduce a signal resistance. According to an embodiment, the signal pads 331*a* and 331*b* and the ground pads 332*a*, 332*b* and 332*c* may be formed in a multilayer structure including the above-described metal or alloy layer and the transparent conductive oxide layer.

According to an embodiment, a transparent layer 410 which covers the first radiator 310*a*, the second radiator 310*b*, the first transmission line 320*a*, the two line segments 321*b* and the pad electrode 330 may be formed on the dielectric layer 110. The transparent layer 410 may be formed using a transparent insulation material such as the above-described transparent film. The transparent layer 410 may include contact holes 411 for partially exposing upper surfaces of the two line segments 321*b*, and the bridge 322*b* may formed on the transparent layer 410 while filling the contact holes 411, thus to electrically connect the two separated line segments 321*b*. In addition, the transparent layer 410 may include capping holes 412 for partially exposing upper surfaces of the signal pads 331*a* and 331*b* and the ground pads 332*a*, 332*b* and 332*c*, and the capping electrode 510 may be formed on the transparent layer 410 while filling the capping holes 412 so as to bond the FPCB to the antenna device. According to an embodiment, the capping electrode 510 may be formed in a solid structure including the above-described metal or alloy.

For the convenience of description, FIG. 2 shows only one antenna unit formed of two radiation bodies 310*a* and 310*b*, but a plurality of antenna units may be arranged on the dielectric layer 110 in a linear array form or a non-linear array form.

Figure 6:
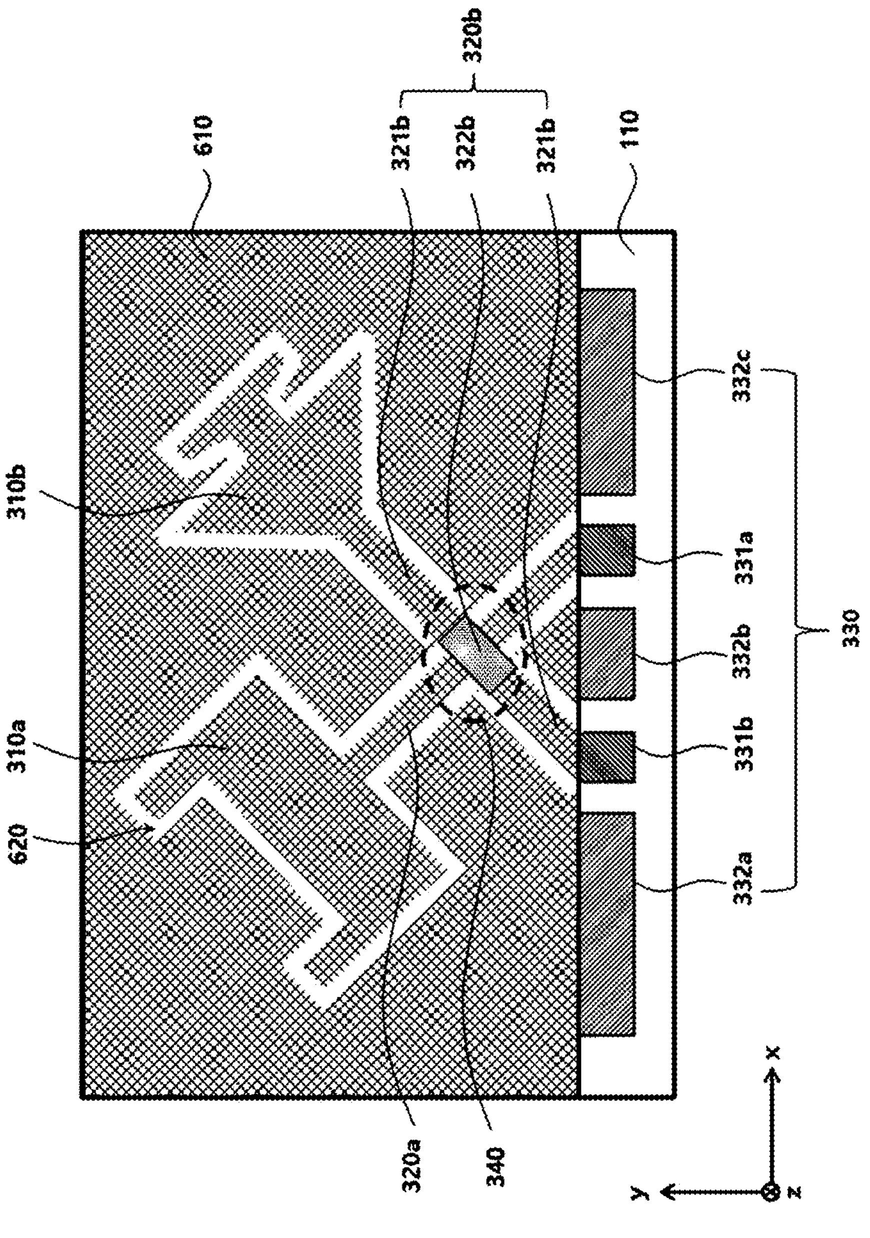
FIG. 6 is a schematic plan view illustrating another embodiment of the antenna device.

FIG. 6 is a schematic plan view illustrating another embodiment of the antenna device. Herein, an antenna device 100*b* of FIG. 6 may be another embodiment of the antenna device 100 shown in FIG. 1.

Referring to FIG. 6, the antenna device 100*b* according to an embodiment may include an antenna conductive layer formed on the dielectric layer 110, and the antenna conductive layer may include a first radiator 310*a*, a second radiator 310*b*, a first transmission line 320*a*, a second transmission line 320*b*, a pad electrode 330 and a dummy pattern 610. Herein, the first radiator 310*a*, the second radiator 310*b*, the first transmission line 320*a*, the second transmission line 320*b* and the pad electrode 330 are the same as those described with reference to FIGS. 1 to 5, and therefore will not be described in detail.

The dummy pattern 610 may be disposed around the first radiator 310*a*, the second radiator 310*b*, the first transmission line 320*a* and the second transmission line 320*b*.

The dummy pattern 610 is formed in a mesh structure having substantially the same structure as at least one of the first radiator 310*a*, the second radiator 310*b*, the first transmission line 320*a* and the second transmission line 320*b*, and may include the same metal as at least one of the first radiator 310*a*, the second radiator 310*b*, the first transmission line 320*a* and the second transmission line 320*b*. According to an embodiment, the dummy pattern 610 may be formed in a segmented mesh structure in which some conductive lines are segmented.

The dummy pattern 610 may be disposed to be electrically and physically separated from the first radiator 310*a*, the second radiator 310*b*, the first transmission line 320*a*, the second transmission line 320*b* and the pad electrode 330. For example, a separation region 620 is formed along side lines or contours of the first radiator 310*a*, the second radiator 310*b*, the first transmission line 320*a* and the second transmission line 320*b* to separate the dummy pattern 610 from the first radiator 310*a*, the second radiator 310*b*, the first transmission line 320*a* and the second transmission line 320*b*.

As described above, by arranging the dummy pattern 610 having substantially the same mesh structure as at least one of the first radiator 310*a*, the second radiator 310*b*, the first transmission line 320*a* and the second transmission line 320*b* around the first radiator 310*a*, the second radiator 310*b*, the first transmission line 320*a* and the second transmission line 320*b*, when the antenna device is mounted on a display device, it is possible to prevent the antenna unit from being viewed by a user of the display device according to a difference in the electrode arrangement by position.

Figure 7:
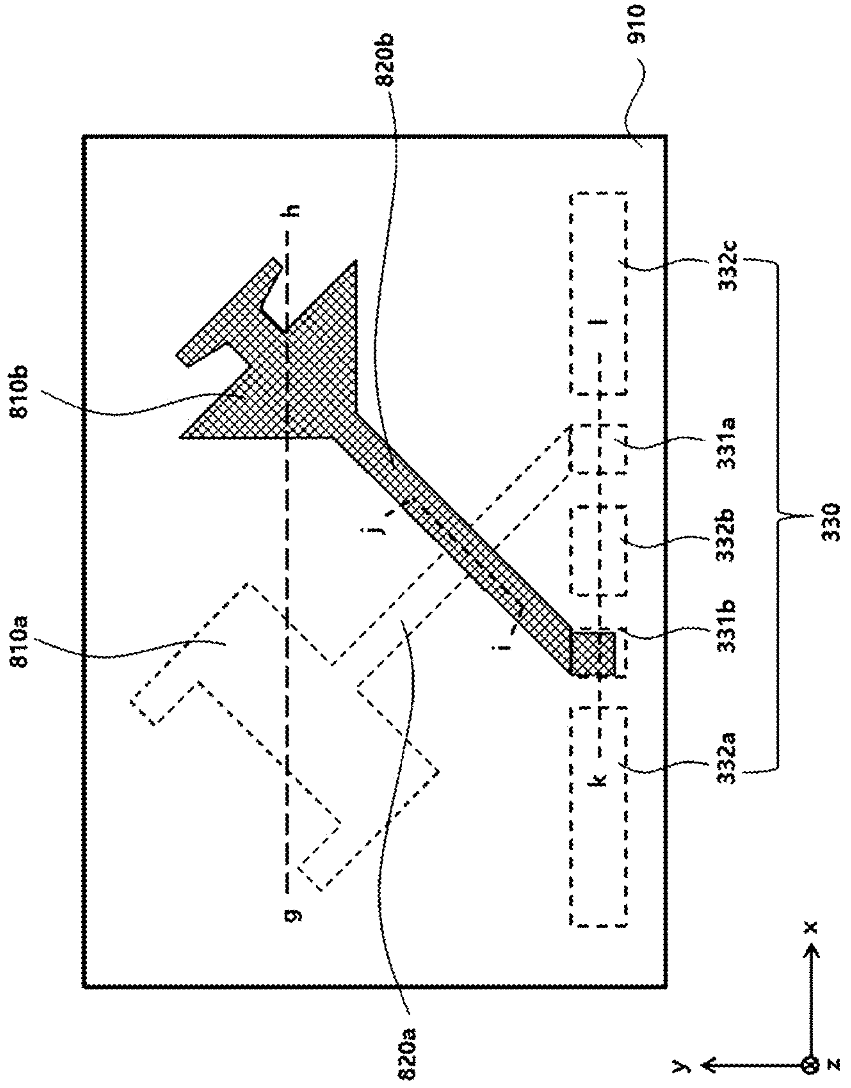
FIG. 7 is a schematic cross-sectional view illustrating another embodiment of the antenna device.
Figure 8:
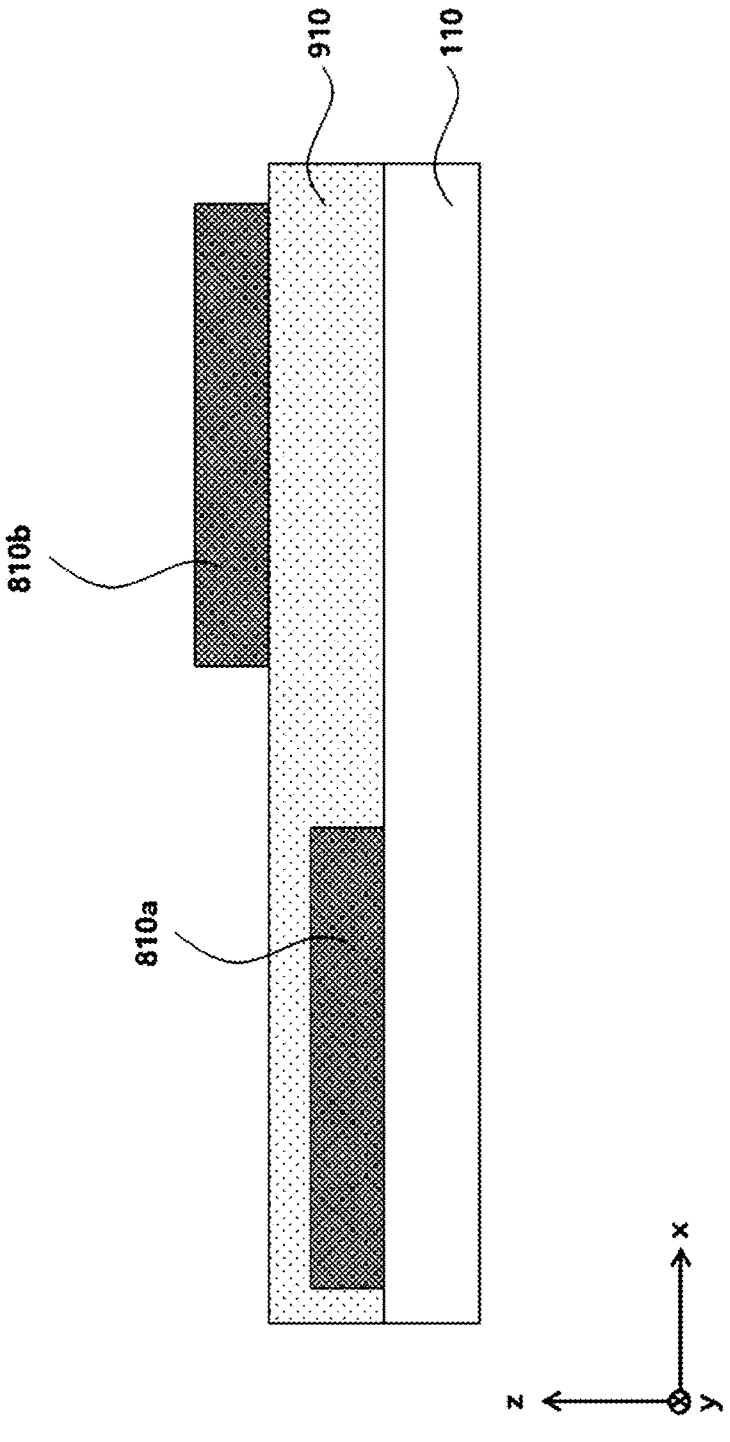
FIG. 8 is a schematic cross-sectional view taken on line g-h in FIG. 7.
Figure 9:
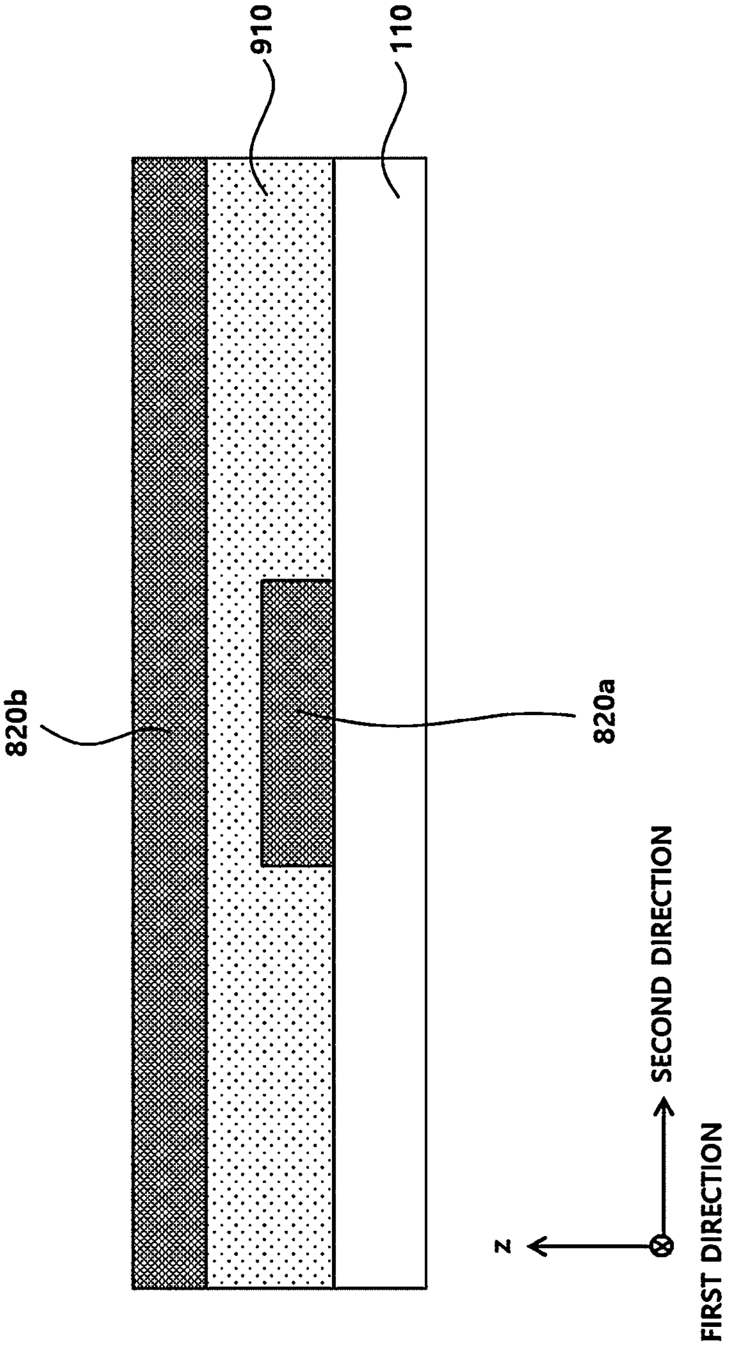
FIG. 9 is a schematic cross-sectional view taken on line i-j in FIG. 7.
Figure 10:
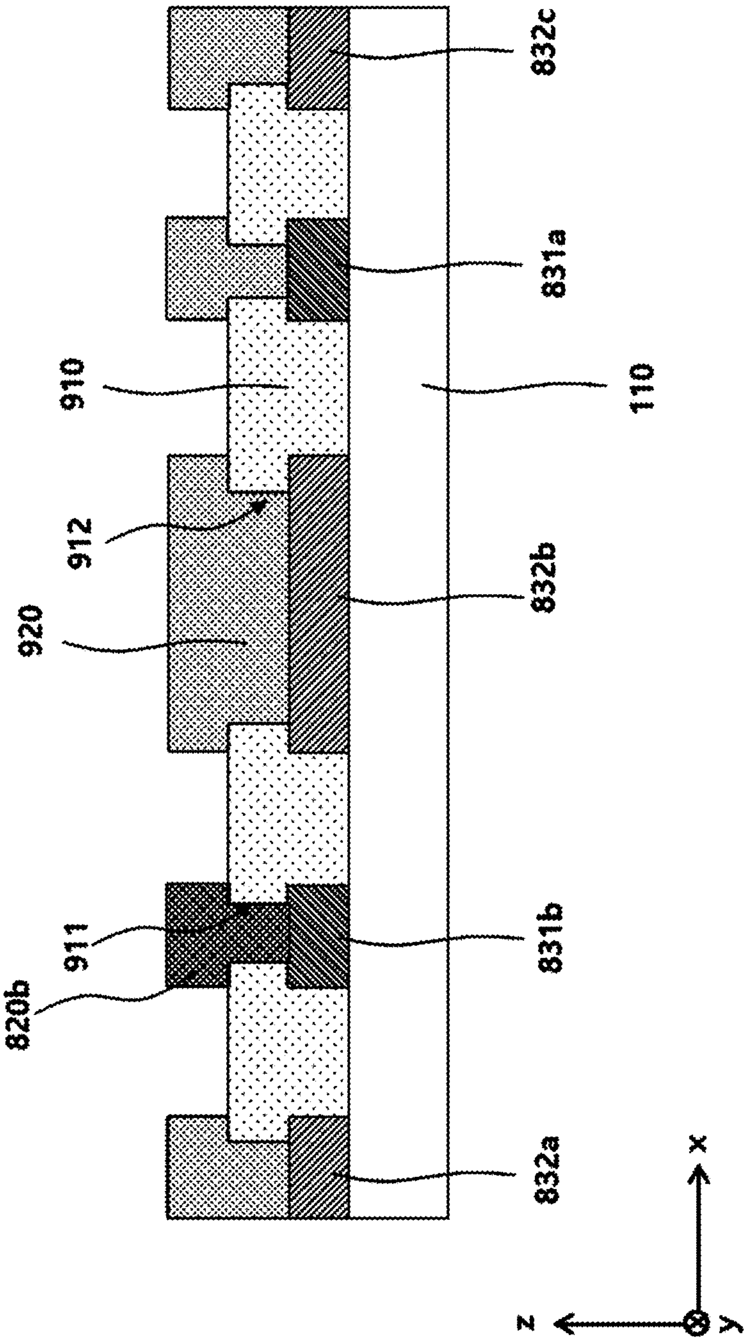
FIG. 10 is a schematic cross-sectional view taken on line k-l in FIG. 7.

FIG. 7 is a schematic cross-sectional view illustrating another embodiment of the antenna device, FIG. 8 is a schematic cross-sectional view taken on line g-h in FIG. 7, FIG. 9 is a schematic cross-sectional view taken on line i-j in FIG. 7, and FIG. 10 is a schematic cross-sectional view taken on line k-l in FIG. 7. Herein, an antenna device 100*c* of FIG. 7 may be another embodiment of the antenna device 100 shown in FIG. 1.

Referring to FIGS. 7 to 10, the antenna device 100*c* according to an embodiment may include an antenna conductive layer formed on the dielectric layer 110, and the antenna conductive layer may include a first radiator 810*a*, a second radiator 810*b*, a first transmission line 820*a*, and a second transmission line 820*b* and a pad electrode 830. Herein, the first radiator 810*a*, the second radiator 810*b*, the first transmission line 820*a*, the second transmission line 820*b* and the pad electrode 830 are similar to the first radiator 310*a*, the second radiator 310*b*, the first transmission line 320*a*, the second transmission line 320*b* and the pad electrode 330, respectively, which are described above with reference to shown in FIGS. 2 to 6, and therefore will not be described in detail within the overlapping range.

The first radiator 810*a*, the first transmission line 820*a* and the pad electrode 830 may be formed on the dielectric layer 110, and a transparent layer 910 may be formed on the dielectric layer 110 to cover the first radiator 810*a*, the first transmission line 820*a* and the pad electrode 830. In addition, the second radiator 810*b* and the second transmission line 820*b* may be formed on the transparent layer 910. In this case, the second transmission line 820*b* may not be segmented unlike the second transmission line 320*b* described above with reference to FIGS. 2 to 6.

The transparent layer 910 may include a contact hole 911 for partially exposing an upper surface of the second signal pad 831*b*, and the second transmission line 820*b* may be formed on the transparent layer 410 while filling the contact hole 911, thus to be electrically connected to the second signal pad 831*b*. In addition, the transparent layer 910 may include capping holes 912 for partially exposing upper surfaces of the first signal pad 831*a* and the ground pads 832*a*, 832*b* and 832*c*, and the capping electrode 920 may be formed on the transparent layer 910 while filling the capping holes 912 so as to bond the FPCB to the antenna device. According to an embodiment, the capping electrode 920 may be formed in a solid structure including the above-described metal or alloy.

According to an embodiment, as shown in FIGS. 8 and 9, the first radiator 810*a* and the first transmission line 820*a*, as well as the second radiator 810*b* and the second transmission line 820*b* may be formed on separate layers with the transparent layer 910 interposed therebetween. Since the first transmission line 820*a* and the second transmission line 820*b* are formed on separate layers, unlike the second transmission line 320*b* of FIGS. 2 to 6, the second transmission line 820*b* may physically and/or electrically intersect the first transmission line 820*a* with being spaced apart therefrom even if it is not segmented.

Meanwhile, according to one embodiment, the dummy patterns 610 of FIG. 6 may be formed on the upper and/or lower surfaces of the transparent layer 910.

In addition, for the convenience of explanation, FIG. 7 shows only one antenna unit formed of two radiation bodies 810*a* and 810*b*, but a plurality of antenna units may be arranged on the dielectric layer 110 in a linear array form or a non-linear array form.

Figure 11:
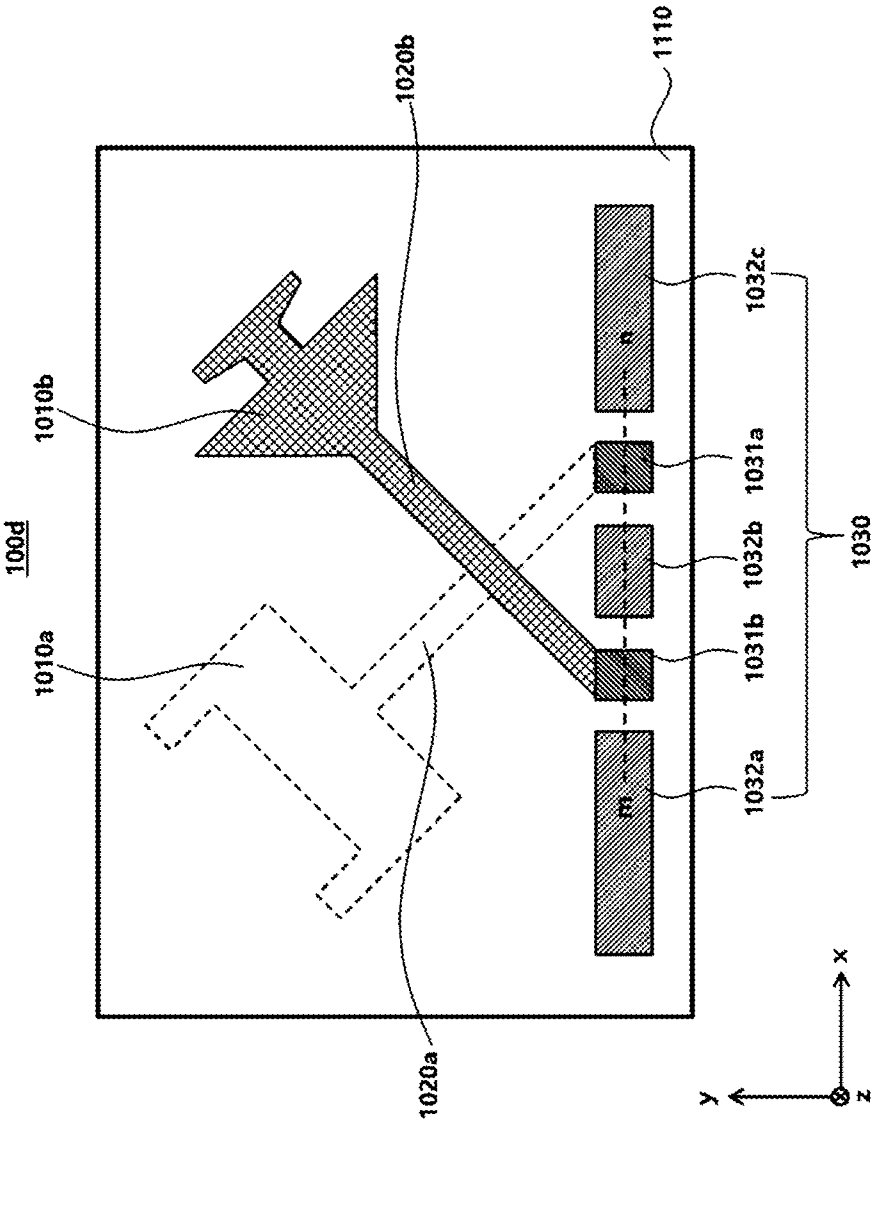
FIG. 11 is a schematic cross-sectional view illustrating another embodiment of the antenna device.
Figure 12:
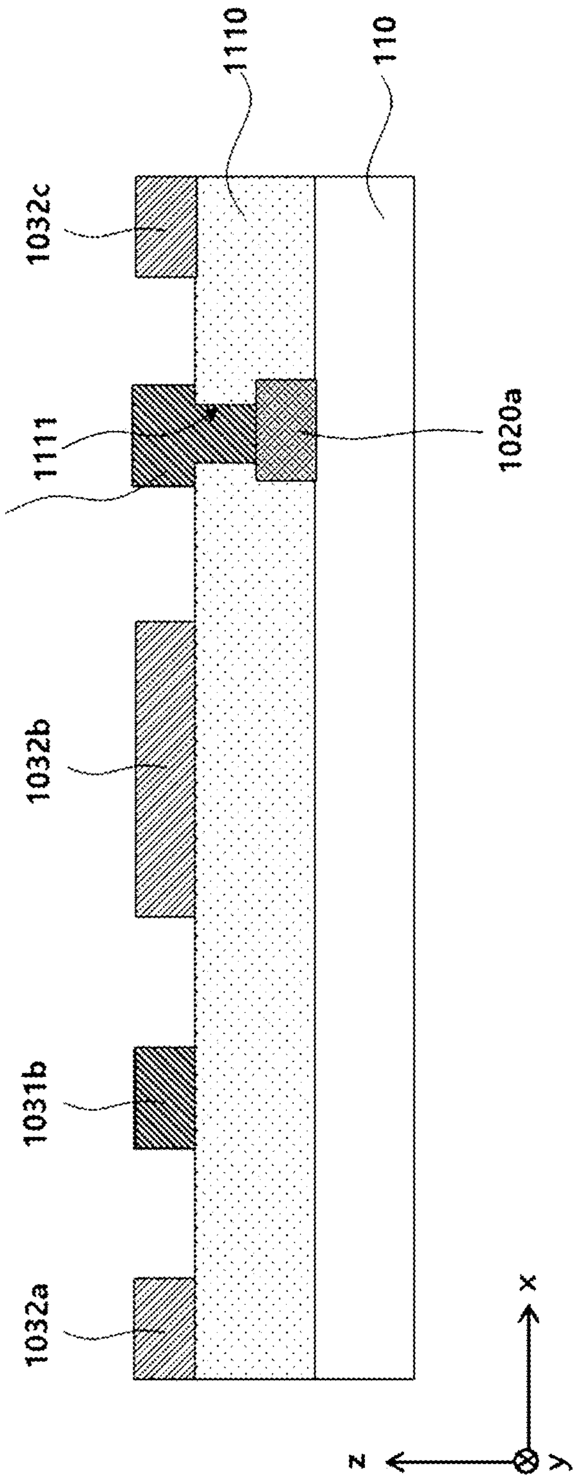
FIG. 12 is a schematic cross-sectional view taken on line m-n in FIG. 11.

FIG. 11 is a schematic cross-sectional view illustrating another embodiment of the antenna device, and FIG. 12 is a schematic cross-sectional view taken on line m-n in FIG. 11. Herein, an antenna device 100*d* of 11 may be another embodiment of the antenna device 100 shown in FIG. 1.

Referring to FIGS. 11 and 12, the antenna device 100*d* according to an embodiment may include an antenna conductive layer formed on the dielectric layer 110, and the antenna conductive layer may include a first radiator 1010*a*, a second radiator 1010*b*, a first transmission line 1020*a*, a second transmission line 1020*b* and a pad electrode 1030. Herein, the first radiator 1010*a*, the second radiator 1010*b*, the first transmission line 1020*a*, the second transmission line 1020*b* and the pad electrode 1030 are similar to the first radiator 810*a*, the second radiator 810*b*, the first transmission line 820*a*, the second transmission line 820*b* and the pad electrode 830 described above with reference to shown in FIGS. 7 to 10, and therefore will not be described in detail within the overlapping range.

The first radiator 1010*a* and the first transmission line 1020*a* may be formed on the dielectric layer 110, and a transparent layer 1110 may be formed on the dielectric layer 110 to cover the first radiator 1010*a* and the first transmission line 1020*a*. In addition, the second radiator 1010*b*, the second transmission line 1020*b* and the pad electrode 1030 may be formed on the transparent layer 1110.

The transparent layer 1110 may include a contact hole 1111 for partially exposing an upper surface of the first transmission line 1020*a*, and the first signal pad 1031*a* may formed on the transparent layer 1110 while filling the contact hole 1111, thus to be electrically connected to the first transmission line 1020*a*. As described above with reference to FIGS. 2 to 12, by arranging two radiation bodies 310*a*, 310*b*; 810*a*, 810*b*; 1010*a* and 1010*b* are disposed in first and second directions which intersect each other, and intersecting two transmission lines 320*a*, 320*b*; 820*a*, 820*b*; 1020*a* and 1020*b* connected to the respective radiation bodies with being physically and/or electrically separated from each other, it is possible to implement a dual polarization antenna with excellent isolation at a compact location.

Figure 13:
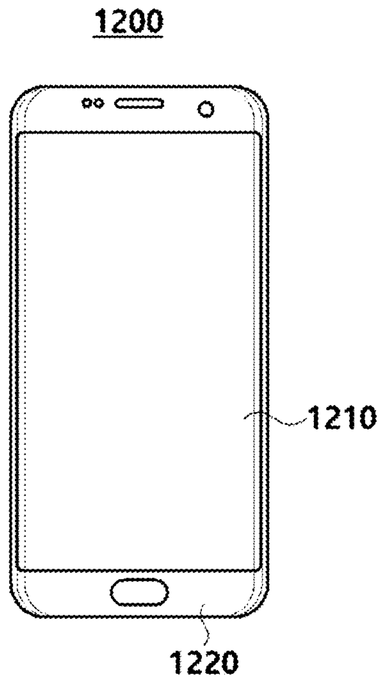
FIG. 13 is a schematic plan view for description an embodiment of a display device.

FIG. 13 is a schematic plan view for description an embodiment of a display device. More specifically, FIG. 13 is a view illustrating an external shape including a window of the display device.

Referring to FIG. 13, a display device 1200 may include a display region 1210 and a peripheral region 1220.

The display region 1210 may indicate a region in which visual information is displayed, and the peripheral region 1220 may an opaque region disposed on both sides and/or both ends of the display region 1210. For example, the peripheral region 1220 may correspond to a light-shielding part or a bezel part of the display device 1200.

According to an embodiment, the above-described antenna device 100 may be mounted on the display device 1200. For example, the first radiator 310*a*, the second radiator 310*b*, the first transmission line 320*a*, and the second transmission line 320*b* of the antenna device 100 may be disposed so as to at least partially correspond to the display region 1210 of the display device 1200, and the pad electrode 330 may be disposed so as to correspond to the peripheral region 1220 of the display device 1200.

A driving circuit such as an IC chip of the display device 1200 and/or the antenna device may be disposed in the peripheral region 1220.

By disposing the pad electrode 330 of the antenna device so as to be adjacent to the driving circuit, signal loss may be suppressed by shortening a path for transmitting and receiving signals.

When the antenna device includes the dummy pattern 610, the dummy pattern 610 may be disposed so as to at least partially correspond to the display region 1210 of the display device 1200.

The antenna device includes an antenna unit and/or the dummy pattern, which are formed in a mesh structure, such that it is possible to significantly reduce or suppress the pattern from being viewed while improving the transmittance. Accordingly, image quality in the display region 1210 may also be improved while maintaining or improving desired communication reliability.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

What is claimed is:

1. An antenna device comprising:

a dielectric layer;

a first radiator disposed on the dielectric layer in a first direction;

a second radiator formed in a shape different from that of the first radiator and disposed on the dielectric layer in a second direction;

a first transmission line extending in the first direction and connected to the first radiator; and a second transmission line extending in the second direction and connected to the second radiator, the second transmission line intersecting the first transmission line with being physically or electrically spaced apart therefrom, wherein each of the first radiator and the second radiator is operated at a multi-band resonance frequency.

2. The antenna device according to claim 1, wherein at least one of the first radiator and the second radiator is formed in a notch shape.

3. The antenna device according to claim 1, wherein the first radiator and the second radiator are operated at the same resonance frequency; and the first radiator is configured to radiate in a broadside direction and the second radiator is configured to radiate in an end-fire direction.

4. The antenna device according to claim 1, wherein the first radiator and the second radiator are operated at the same resonance frequency; and the first radiator and the second radiator are configured to radiate in a broadside direction or in an end-fire direction.

5. The antenna device according to claim 1, wherein the first radiator and the second radiator are operated at different resonance frequencies; and the first radiator is configured to radiate in a broadside direction and the second radiator is configured to radiate in an end-fire direction.

6. The antenna device according to claim 1, wherein the first radiator and the second radiator are operated at different resonance frequencies; and the first radiator and the second radiator are configured to radiate in a broadside direction or in an end-fire direction.

7. The antenna device according to claim 1, wherein the first radiator, the second radiator, the first transmission line and the second transmission line are formed on the same layer; and the second transmission line comprises two separated line segments, and a bridge electrically connecting the two separated line segments.

8. The antenna device according to claim 1, wherein the first radiator and the second radiator are formed on different layers.

9. The antenna device according to claim 8, wherein a transparent layer is formed between the first radiator and the second radiator.

10. The antenna device according to claim 1, wherein the first direction and the second direction intersect each other.

11. The antenna device according to claim 10, wherein the first direction and the second direction are parallel to an upper surface of the dielectric layer, and intersect a longitudinal direction of the antenna device.

12. A display device comprising the antenna device according to claim 1.

13. An antenna device comprising:

a dielectric layer;

a first radiator disposed on the dielectric layer in a first direction;

a second radiator formed in a shape different from that of the first radiator and disposed on the dielectric layer in a second direction;

a first transmission line extending in the first direction and connected to the first radiator; and a second transmission line extending in the second direction and connected to the second radiator, the second transmission line intersecting the first transmission line with being physically or electrically spaced apart therefrom, wherein the first radiator and the second radiator are operated at the same resonance frequency, and the first radiator is configured to radiate in a broadside direction and the second radiator is configured to radiate in an end-fire direction.

14. An antenna device comprising:

a dielectric layer;

a first radiator disposed on the dielectric layer in a first direction;

a second radiator formed in a shape different from that of the first radiator and disposed on the dielectric layer in a second direction;

a first transmission line extending in the first direction and connected to the first radiator; and a second transmission line extending in the second direction and connected to the second radiator, the second transmission line intersecting the first transmission line with being physically or electrically spaced apart therefrom, wherein the first radiator, the second radiator, the first transmission line and the second transmission line are formed on the same layer, and the second transmission line comprises two separated line segments, and a bridge electrically connecting the two separated line segments.

* * * * *